United States Patent
Komandur et al.

(10) Patent No.: US 7,327,708 B2
(45) Date of Patent: Feb. 5, 2008

(54) MULTIMEDIA TRAFFIC OPTIMIZATION

(75) Inventors: Sridhar Komandur, Richardson, TX (US); Gokul V. Subramaniam, Bangalore (IN); Jogen K. Pathak, Irving, TX (US); Shridhar Krishnamurthy, Coppell, TX (US); Janet H. Lind, Plano, TX (US); Prasad Govindarajan, Plano, TX (US)

(73) Assignee: Inet Technologies, Inc., Richardson, TX (US)

( * ) Notice: Subject to any disclaimer, the term of this patent is extended or adjusted under 35 U.S.C. 154(b) by 965 days.

(21) Appl. No.: 10/423,995

(22) Filed: Apr. 25, 2003

(65) Prior Publication Data

US 2004/0047290 A1    Mar. 11, 2004

Related U.S. Application Data

(60) Provisional application No. 60/375,867, filed on Apr. 25, 2002, provisional application No. 60/397,118, filed on Jul. 19, 2002.

(51) Int. Cl.
*H04Q 7/00*   (2006.01)
(52) U.S. Cl. .............................. 370/332; 370/349
(58) Field of Classification Search .......... 370/310.2, 370/328, 332, 338, 349, 351–358
See application file for complete search history.

(56) References Cited

U.S. PATENT DOCUMENTS

| 6,522,658 | B1 * | 2/2003 | Roccanova | 370/441 |
| 6,708,034 | B1 * | 3/2004 | Sen et al. | 455/445 |
| 6,728,208 | B1 * | 4/2004 | Puuskari | 370/230.1 |
| 6,728,215 | B1 * | 4/2004 | Alperovich et al. | 370/252 |
| 6,760,344 | B2 * | 7/2004 | Mizell et al. | 370/475 |

* cited by examiner

*Primary Examiner*—Brenda Pham
(74) *Attorney, Agent, or Firm*—Fulbright & Jaworski LLP

(57) ABSTRACT

A system and method for optimizing a multimedia transmission from a content source to an end user over a link. The wireless content switch comprising an upstream port for receiving one or more data packets and for transmitting one or more status to a content source, a downstream port for transmitting the one or more data packets and for receiving one or more status from an end user, at least one processing unit coupled to the upstream and down stream ports, and memory for storing the one or more data packets responsive to receiving the data packets. Optimization code is stored in the memory, the optimization code, when executed, receiving at least one data packet, transmitting the data packet, receiving status information, transmitting status information, determining quality of service assigned to the end user, determining session specific status for the end user, and transmitting the quality of service and session specific status.

38 Claims, 7 Drawing Sheets

MULTIMEDIA TRAFFIC OPTIMIZATION

CROSS-REFERENCE TO RELATED APPLICATIONS

This application claims the priority benefit of U.S. Provisional Applications for Patent, Ser. No. 60/375,867, entitled "Multimedia Traffic Optimizations for Wireless," filed Apr. 25, 2002 and Ser. No. 60/397,118, entitled "Intelligent UDP Application Delivery Over Wireless." filed Jul. 19, 2002, both of which are hereby incorporated by reference for all purposes.

STATEMENT REGARDING FEDERALLY SPONSORED RESEARCH/DEVELOPMENT

Not Applicable

FIELD

The present application is related to wireless packet data networks, and more particularly to multimedia traffic optimization in wireless packet data networks.

BACKGROUND

Wireless networks are increasingly being used for accessing the Internet. Wireless packet data protocols such as Universal Mobile Telecommunications System (UMTS), General Packet Radio Service (GPRS), EDGE, WCDMA, Fixed Wireless, and 4G technologies were developed to facilitate the transmission of data packets over the wireless network.

The Internet is a global network connecting computers from government agencies, educational institutions, the military, and businesses from around the world. Data is transmitted over the Internet using data packets. The data packets are sent from a sender to a recipient over any one of a number of network connections between the sender and recipient. Unlike a switched network, no dedicated connection between the sender and recipient is established. In contrast, the packets are sent from the sender with an address associated with the recipient, such as an Internet Protocol address (IP address) over any one of a number of available paths between the sender and recipient. This IP addressing scheme is also used within the Wireless Internet, along with other specific wireless protocols.

The Wireless Internet is intended to provide access to the Internet in general, but there are also application clusters and application infrastructure within the Wireless Carrier networks. Most 2.5G/3G/4G/Fixed Wireless wireless operators provide some data services from within their carrier network boundaries, either as a "walled garden" or a hybrid/quasi walled garden created through content and service provider partnerships. These walled gardens are separated from the Internet by firewalls and generally have had content or access methods modified to match wireless access device capabilities. There are a number of data service technologies that will reside on the Internet or within these walled gardens, supporting applications and services infrastructures such as:

Portal Services
Gaming Services
Streaming Media Services
WAP Services
Instant Messaging Services
Multimedia Messaging Services
Personal Network Storage Services
Location based Services Multimedia content delivery via streaming and downloading is one of the key services most 2.5G/3G carriers want to offer. This service will deliver various types of content including text, voice, music, and video clips. This content may be user to user based, such as transmitting a picture and text from a camera phone. Additionally, news, sports clips, and short animation (vector graphics)/macromedia clips may also be delivered as multi-media services.

Typical multimedia application and services that carriers desire to offer over wireless include the following:

(1) Streaming Media (Audio and Video)—On demand content:
  One to One with one wireline source and one wireless access receiver;
(2) Live Webcasting (Audio and Video)—Live content:
  One to Many with one wireline source and many wireless access receivers;
(3) Conferencing (Audio and Video)—Live content:
  Many to Many with many wireless sources and many wireless access receivers; and
(4) Multimedia Downloads—On demand and Scheduled:
  One to One with one wireline source and one wireless access receiver.

Streaming media servers are part of the application cluster that works with other applications infrastructure to provide multimedia content for services. Multimedia delivery over wireless involves a delivery mechanism (streaming/downloading) that is adapted to wireless access characteristics, network resource awareness, session characteristics and Quality of Service (QoS) negotiated for each session. Current adaptation techniques involve end to end packet exchange between the delivery servers and end-user client applications on wireless terminals and other devices connected to wireless modems. Streaming servers use the Real Time Streaming Protocol (RTSP), the Real Time Transport Protocol (RTP), and the Real Time Control Protocol (RTCP) to deliver streaming multimedia. RTSP is used to setup and teardown connections besides performing other control features. RTSP also provides remote control functionality to play and pause streams to the client. The RTP protocol is used for media transport. The desired data is sent over RTP to and from a client 10 and a server 12 which runs on top of the User Datagram Protocol (UDP) in most implementations as is shown in FIG. 1. RTCP is used to exchange reports between parties in session. RTCP provides feedback on the quality of data distribution, can be used to send reports, and for synchronization of different media streams, such as lip syncing.

Both active senders and receivers send the RTCP reports. In some cases RTCP is exchanged between receivers in order to know if a problem is local or global. Streaming servers also use RTCP reports for control of adaptive streaming. From receiver reports, the server understands jitter, packet loss and round trip delays that are useful in adapting the streaming rate (variable bit rate encoding) to deliver the media content. RTCP message exchange is limited to a small and known fraction of the session bandwidth, with the interval between 2 RTCP packets recommended to be greater than 5 seconds. Most streaming media servers spend some initial time before the actual streaming of data packets to gather user perceived network characteristics. Servers use this to start streaming with a particular encoding rate. During the middle of streaming, if the server supports the adaptive encoding/streaming rate feature, it will periodically exchange RTCP packets to change streaming rate to suit user throughput.

FIGS. 2, 3, and 4 show the wireless adaptation protocol overhead involved for the delivery of 3 different multimedia applications. FIG. 2 is the Streaming media on demand where the client 20 (receiver) requests RR the stream from the server 22 (sender) or the server 22 requests SR the stream from the client 20. FIG. 3 represents a live Webcast, where request streams from a server. The participants in a Webcast can be senders 34, receivers 30, 31 and 32, or both. As the number of participants increase, the number of RTCP reports also increases. FIG. 4 depicts audio-video conferencing, in which participants are senders 46 and receivers 40, 42 and 44, and significant numbers of RTCP reports are required. This RTSP, RTP, RTCP packet exchange utilizes wireless access bandwidth and is subject to the lossy nature of the wireless air interface as well as the mobility of the wireless end-user. Such end-to-end packet exchange between delivery servers and wireless terminals for adaptation is cumbersome under substantial varying throughput conditions as well as zero throughput conditions. Furthermore, exchanging reports between the sender and receiver over wireless access is costly and information gathered through such reports is not always real-time. The responsiveness for content delivery adaptation is slow when reports on access and session characteristics are exchanged over air interfaces, which results in a degraded service delivery.

The goal of delivering multimedia services for wireless users, coupled with the challenges of current adaptation techniques, has created a need for clear heuristics and a statistical analysis of multimedia traffic to provide intelligent network resource aware media delivery for peak and off-peak times (busy hour vs. idle time). These improvements can then allow servers (senders/streaming media servers) to control the streaming flow rate or to stop or suspend media delivery during poor radio conditions and obtain higher precedence over other applications.

SUMMARY

Presented herein is a system and method for optimizing a multimedia transmission from a content source to an end user over a wireless link. The wireless content switch comprising an upstream port for receiving one or more data packets and for transmitting one or more status to a content source, a downstream port for transmitting the one or more data packets and for receiving one or more status from an end user, at least one processing unit coupled to the upstream and down stream ports, and memory for storing the one or more data packets responsive to receiving the data packets. Optimization code is stored in the memory, the optimization code, when executed, receiving at least one data packet, transmitting the data packet, receiving status information, transmitting status information, determining quality of service assigned to the end user, determining session specific status for the end user, and transmitting the quality of service and session specific status.

BRIEF DESCRIPTION OF THE DRAWINGS

For a more complete understanding of the present invention, and for further details and advantages thereof, reference is now made to the following Detailed Description taken in conjunction with the following drawings, in which.

DETAILED DESCRIPTION OF THE DRAWINGS

Figure 1:
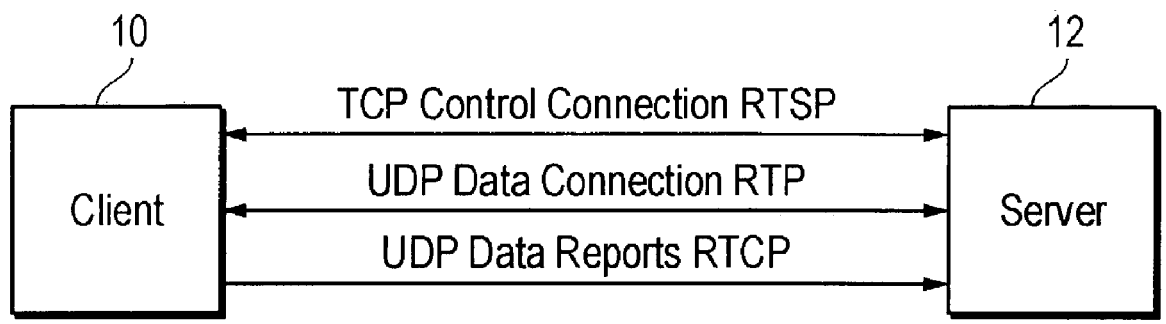
FIG. 1 is a block diagram of streaming media using RTSP, RTP and RTCP protocols according to the prior art.
Figure 2:
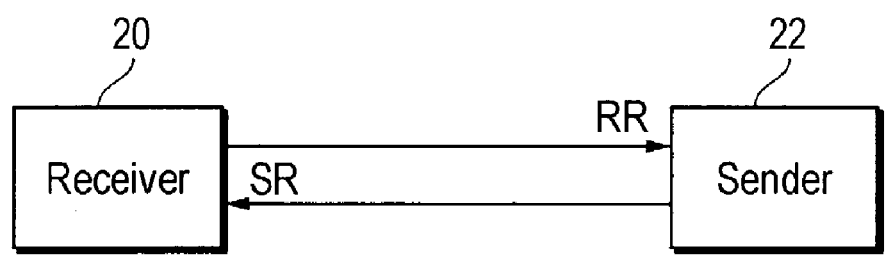
FIG. 2 is a block diagram of a streaming media demand according to the prior art.
Figure 3:
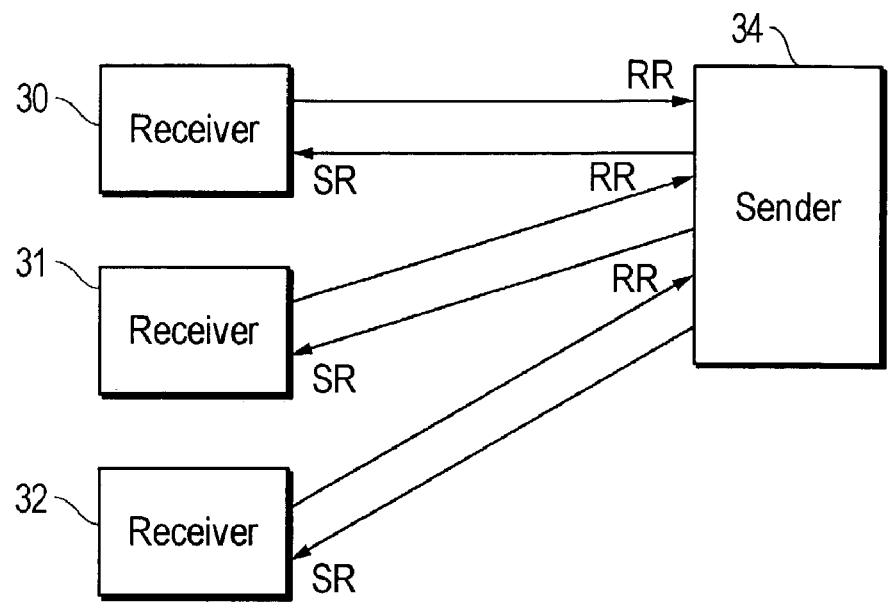
FIG. 3 is a block diagram of a webcast with the request streaming from the server according to the prior art.
Figure 4:
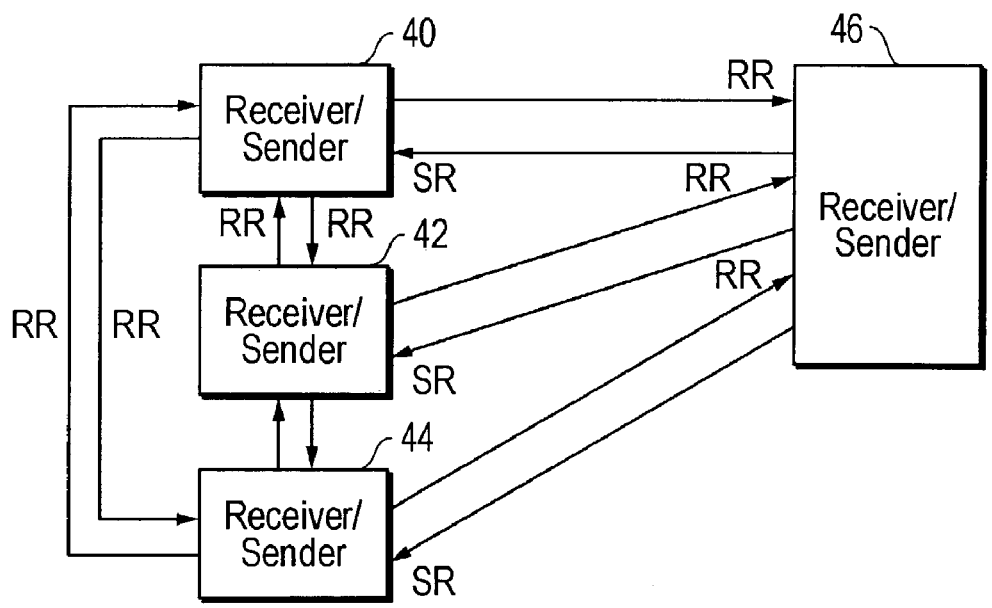
FIG. 4 is a block diagram of an audio-video conference according to the prior art.

In the descriptions that follow, like parts are marked throughout the specification and drawings with the same numerals, respectively. The drawing figures are not necessarily drawn to scale and certain figures may be shown in exaggerated or generalized form in the interest of clarity and conciseness.

Figure 5:
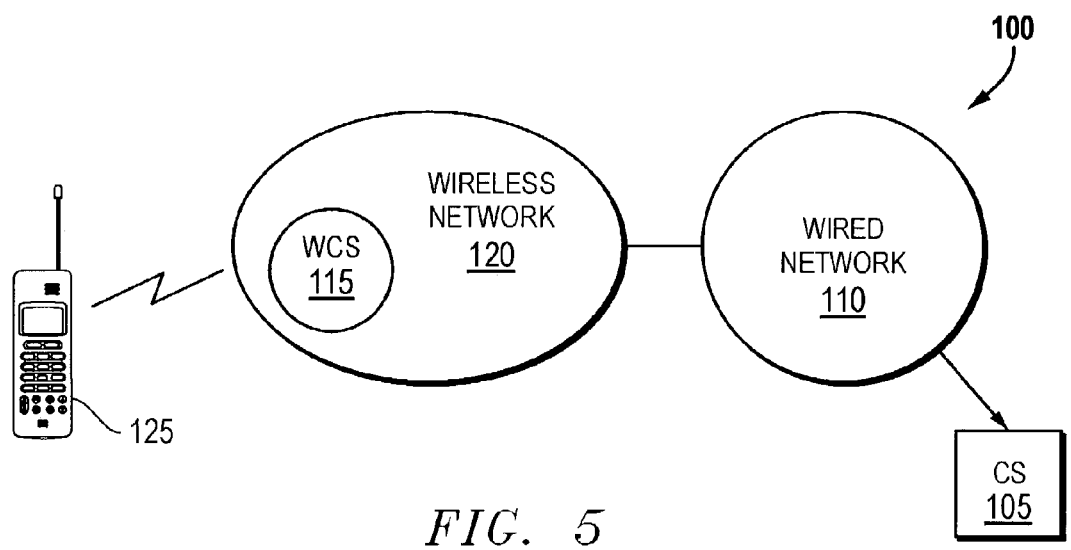
FIG. 5 is a block diagram of an exemplary data communication system.

Referring now to FIG. 5, there is illustrated a conceptual diagram of a communication system, referenced generally by the numeric designation 100, for sending data packets from content source 105 to a mobile station 125. The content source 105 is a server providing information which can comprise, for example, a web server, email server, ftp server, database server, streaming audio/video server providing streaming media, or an application server.

Information from the content source 105 is transmitted in the form of numbered data packets over a wired network 110, wherein each data packet is associated with a packet number. The wired network 110 is a packet data wireline communication system which can comprise, for example, a local area network, a wide area network, a walled garden on a local area network, a walled garden or quasi walled garden on a wide area network, or the Internet. The wired network 110 transmits the data packets to a wireless network 120 associated with the mobile station 125 via the wireless infrastructure, including a wireless-content switch 115. The content source 105 uses the RTSP, RTP, and RTCP protocols that support streaming multimedia to and from a wired device or the mobile station 125.

The wireless network 120 comprises any communication network that can transmit packet data over a wireless air interface. For example, the wireless network 120 can comprise cellular data networks, such as the Code-Division Multiple Access (CDMA), the Global System for Mobile Communications (GSM) or the Personal Communication System (PCS), equipped to transmit packet data in accordance with the Universal Mobile Telecommunications System (UMTS), General Packet Radio Service (GPRS) or EDGE protocols. The wireless network 120 transmits the packet data over the wireless air interface to the mobile station 125.

A wireless content switch 115 receives packets in wireless network data formats (for example, GPRS Tunneling Protocol (GTP) format packet data) and can determine additional processing that may be required or create session flow information based upon the mobile station 125, and the type of content in the packet, priority data, quality of service data, multicasting functionality, or other suitable functions. In one disclosed embodiment, the wireless content switch 115 is an Intelligent Packet Control Node (IPCN) developed and manufactured by Cyneta Networks, Inc. The wireless content switch 115 can also aggregate this information to determine characteristics of all flows targeted to a given shared resource, be that a single device running multiple sessions, or a single cell supporting multiple devices. In addition to analyzing the flow, the wireless content switch 115 can also perform additional processing to actively participate in the RTSP, RTP, RTCP protocols, serving in the role of a proxy for either the mobile device 125 or the content source 105.

In one disclosed embodiment, the wireless carrier only allows tapping, or monitoring of data, within the wireless infrastructure. In this embodiment, the wireless content switch 115 is responsible for the flow management. In another disclosed embodiment, the wireless carrier prefers to have all flow modifications performed outside of the wireless infrastructure. In this embodiment, the wireless content switch 115 can be set into a tapping mode, and can send information to a second wireless content switch 130 (not shown), which is located closer to the streaming servers. The optional wireless content switch 130 can then be responsible for any flow modification.

The content source's 105 streaming of multimedia is based upon the conditions of the wired network 110 and the wireless network 120, including (1) the initial session Quality of Service (QoS) committed by the wireless network 120, including attributes such as minimum and maximum bandwidth, bit error rate, and specific cell RF capacity if GPRS and (2) the session specific information during media delivery such as jitter, packet loss, mobility information, roundtrip delay, and bandwidth variations. By evaluating this information, the content source 105 can provide high quality multimedia streaming over the wireless network 120.

The air interface between the mobile station 125 and the wireless network 120 is characterized by comparatively high bit error rates, limited bandwidth, radio interference, and intermittent hand-offs. The air interface is considered a relatively scarce resource, and therefore protocol overhead is considered an inefficient use of this limited bandwidth. Although multimedia clients that might reside on mobile devices 125 may be capable of supporting the RTSP, RTP, RTCP protocol exchanges, obtaining session and network characteristic information directly from the mobile device 125 with wireless air interface access increases the bandwidth required for non-traffic packets and also increases latency. This results in slow content source 105 responsiveness and adaptation, which defeats the purpose of providing better user experience.

Figure 5A:
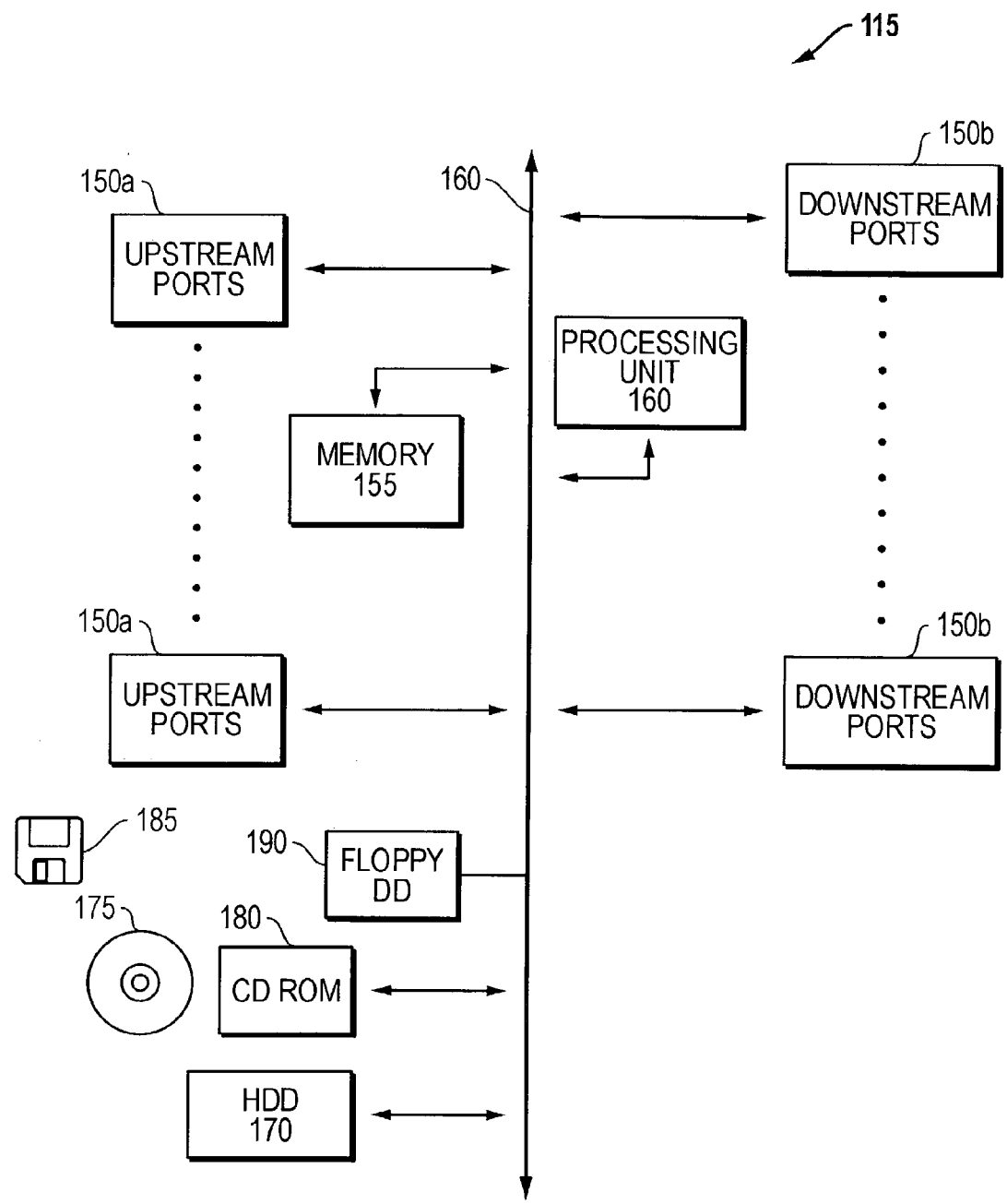
FIG. 5A is a block diagram of an exemplary wireless content switch.

Referring now to FIG. 5A, there is illustrated a block diagram of an exemplary wireless content switch 115. The wireless content switch 115 includes any number of upstream ports 150a and downstream ports 150b. The upstream ports 150a facilitate connection of the wireless content switch 115 towards the content source 105 via a trunk line, such as, for example, a T1, E1, or an Ethernet connection, to name a few. Connection of the wireless content switch 115 towards the content source 105 via the upstream port 150a permits, at the upstream port 150a, receipt and transmission of data packets, acknowledgments, and other signals to and from content source 105.

Similarly, the downstream ports 150b facilitate connection of the wireless content switch 115 towards the mobile station 125. Connection of the wireless content switch 115 towards the mobile station 125 via the downstream port 150b permits, at the downstream port 150b, receipt and transmission of data packets, acknowledgments, and other signals to and from the mobile station 125.

The wireless content switch 115 also includes memory 155 wherein packets received from the upstream port 150a are stored. In one embodiment, the memory 155 can comprise Shared Dynamic Random Access Memory (SDRAM). Packets received from upstream port 150a are transmitted along a bus 160 for storage into the memory 155. Data packets stored in the memory 155 are transmitted by forwarding the data packet from the memory 155 to the downstream port 150b via bus 160.

The memory 155 can also store executable instructions for execution by a processing unit 165. Until required by the processing unit 165, the instructions may be stored in another memory, for example in a hard disk drive 170, or in a removable memory such as an optical disk 175 for eventual use in a compact disk read only memory (CD-ROM) drive 180 or a floppy disk 185 for eventual use in a floppy disk drive 190. Examples of such executable instructions include the multimedia traffic optimization process disclosed herein.

Referring now to FIGS. 6 and 7a-7f, there are illustrated a block diagram and signal flow diagrams of an exemplary multimedia communication system. Both the end user 225 and the content source 205 communicate over a communication path which includes a wired network 215, which can comprise, for example, the Internet. The end user 225 accesses the wired network 215 by means of a wireless network 220 which communications with the end user 225 over a wireless air interface.

The wireless network 220 is interfaced with the wired network 215 by any number of Gateway GPRS Support Nodes (GGSNs) 235. Each GGSN 235 is associated with any number of Internet Protocol (IP) addresses which the GGSN 235, in turn allocates to end users 225.

The wireless network 220 services to geographical areas which are divided into routing areas. Each routing area is associated with a particular Serving GPRS Support Node (SGSN) 230. Each SGSN 230 is associated with any number of base station systems 240. The base station system 240 is the radio transceiver equipment which transmits and receives signals to and from the end user 225 over a wireless air interface 238.

Some wireless Internet carriers provide data services from within the wireless network 220, typically in the form of a walled garden 245. The walled garden 245 is separated from the wired network 215 by a firewall 248 and have content or access methods modified to match the end user 225 capabilities.

A wireless content switch 218 is located near the SGSN 230 and is connected to the Gb and Gn interfaces on upstream and downstream side of the SGSN 230 and receives all signals passed there between. The foregoing signals permit the wireless content switch 218 to monitor the wireless air interface 238 and the conditions of the wireless network 220. The wireless content switch 218 is described in U.S. patent application Ser. No. 09/718,723 entitled "System and Method for Wireless Content Switch", filed Nov. 22, 2000 and in U.S. patent application Ser. No. 09/839,830 entitled "System and Method for Wireless Packet Data Content Switch", filed Apr. 19, 2001, both of which are hereby incorporated by reference for all purposes. The wireless content switch 218 includes a memory, a mass storage device, a processor and a communication device, all of which are not shown. The wireless content switch 218 further includes code to perform session management, measurement of the wireless network's 120 quality, and to act as a proxy in the RTP, RTSP and RTCP protocols. Specific details of the capabilities of the code and the wireless content switch 218 are disclosed herein.

The content source 205 uses a variety of status and control information of the wireless network 220 to provide a high quality experience for the end user 225. Such status and control information, including Quality of Service and session specific information and use thereof by the content source 205 is well known to those skilled in the art. Such information including, but not limited to the following:

| Message to content source | Information contained in Message |
| --- | --- |
| Activate PDP Context Accept | Negotiated QoS Profile at SGSN (Level 2) |
| Modify PDP Context Req/Accept | Negotiated QoS Profile at SGSN (Level 2) |
| Attach Accept | Radio Priority |
| Routing Area Update Accept | Mobility Information/Routing Area Information |
| DL Unit data | QoS Profile (Level 3) - Close to QoS that may be used at RLC |
| UL Unit data | QoS Profile (Level 3) - Close to QoS that may be used at RLC |
| Radio Status | Radio Cause |
| Suspend (Ack) | Link Availability |
| Resume (Ack) | Link Availability |
| Create BSS PFC (Ack) | ABQP |
| Download BSS PFC (Ack) | ABQP |
| Flow Control | Leak Rate - BSS Bandwidth Allocation towards Mobile |
| Create PDP Context Response | Negotiated QoS Profile at GGSN (Level 3) |
| Update PDP Context Response | Negotiated QoS Profile at GGSN (Level 3) |

Figure 6:
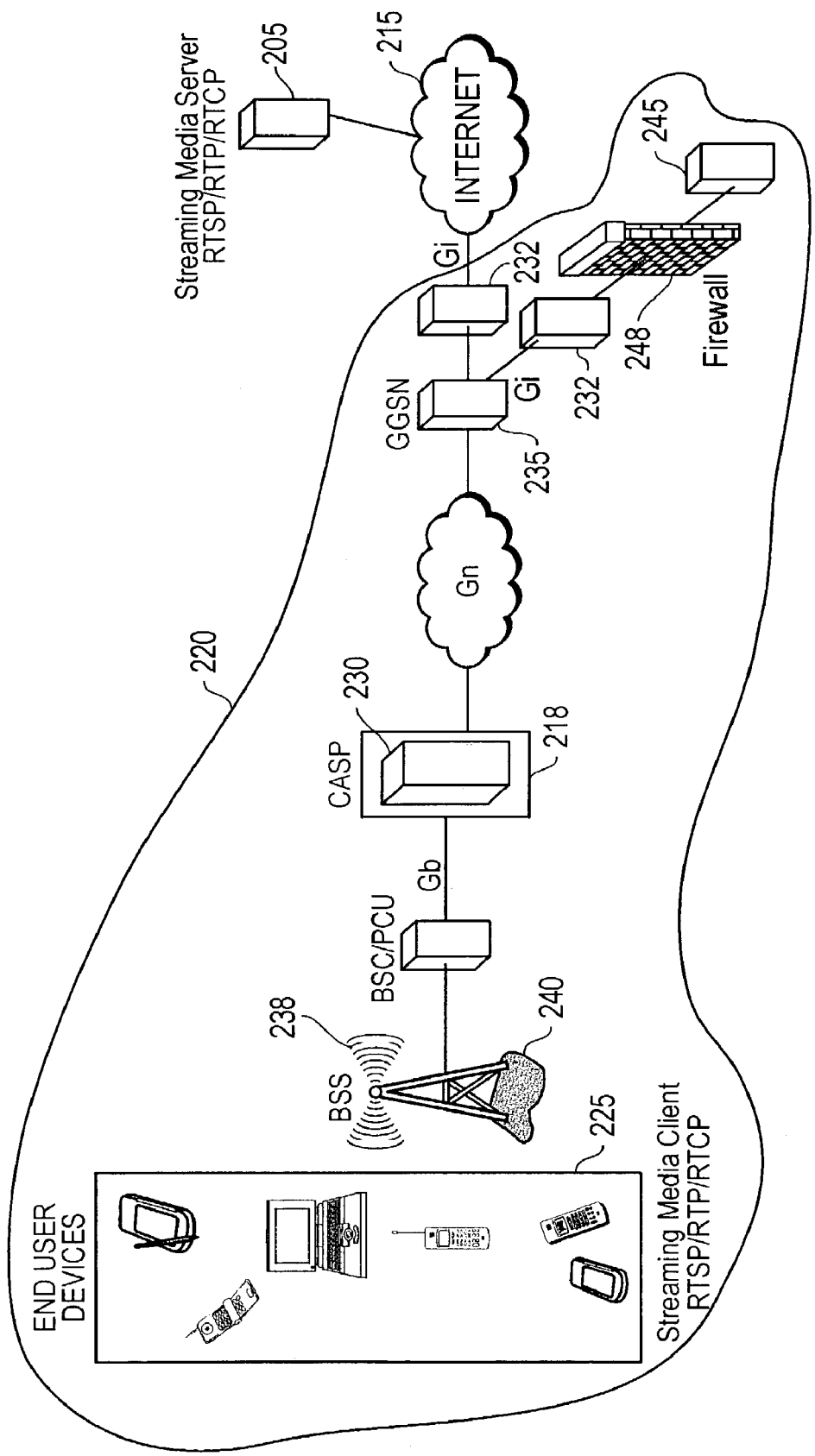
FIG. 6 is a block diagram of an exemplary multimedia communication system.

The exemplary multimedia communication system of FIG. 6 discloses the methods and systems to provide such information in a timely fashion and without consuming valuable bandwidth.

Figure 7A:
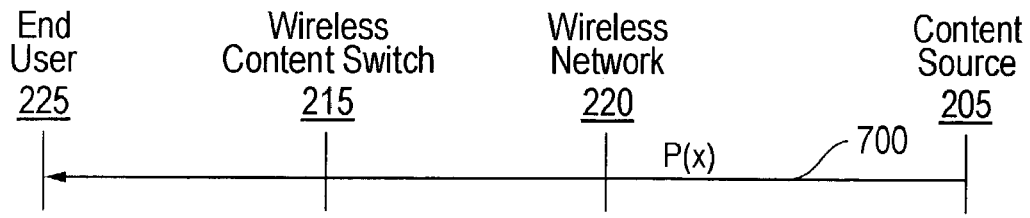
FIGS. 7a-7f are signal flow diagrams of the exemplary multimedia communication system according to the present invention.
Figure 7B:
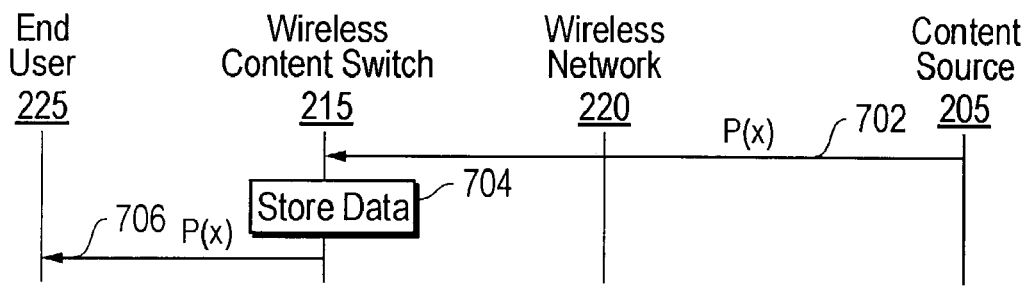

A wireless content switch 218 receives the data packets 702 sent from the content source 205, including streaming servers, multimedia servers, and media servers, and stores the data packets 704 and forwards the data packet 706 to the end user 225 as shown in FIG. 7*b*. Alternatively, the wireless carrier may choose to have the wireless content switch 218 work in a tapping configuration and observe the data packets 700 as they are sent between the content source 205 and the end user 225 as shown in FIG. 7*a*. In either case, wireless content switch 218 analyzes the data packet. The wireless content switch 218, or the combination of the wireless content switch 218 and optional wireless content switch 232, can act as a proxy in the RTSP, RTP, RTCP protocols to avoid the bandwidth overhead or to support devices that do not themselves support these protocol capabilities. The wireless content switch 218 may also use other protocols such as Internet Content Adaptation Protocols (ICAP) to provide reports to the content sources 205. These schemes are discussed more fully herein.

Figure 7C:
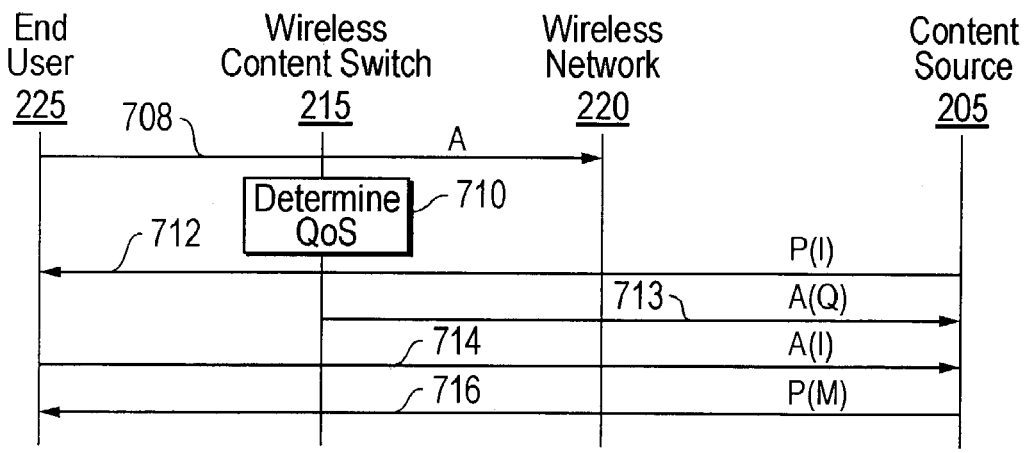

The wireless content switch 218 analysis of the individual flows can be used to provide the initial session Quality of Service information, which assists the content source 205 to determine the appropriate encoding rate ranges instead of estimating a range and then refining it based on RTCP reports as is known in the art as is shown in FIG. 7*c*. The Quality of Service is negotiated for each session between the end user 225 and the wireless carrier. When the end user 225 enters the BSS 240 cell area, the end user 225 signals 708 the wireless content switch 218 in the wireless network 220 of the end user's 225 presence. The wireless content switch 218 determines the Quality of Service 710 through a look-up table containing the level of service to be provided to this end user 225. A wide variety of calculations can be implemented to determine the Quality of Service without detracting from the spirit of the invention. The content source 205 provides the end user 225 with preliminary data and requests 712 prior to establishing a multimedia link. When the wireless content switch 218 observes the request 712, the wireless content switch 218 transmits the initial Quality of Service 713 to the content source 205. The content source 205 incorporates this information along with the end user's 225 response to the data request 714 in transmitting the multimedia stream 716. The Quality of Service information also improves the user's experience by bringing down the Play delay, which is the time taken for the user to see or hear any audio after pressing the Play button on the client player.

Figure 7D:
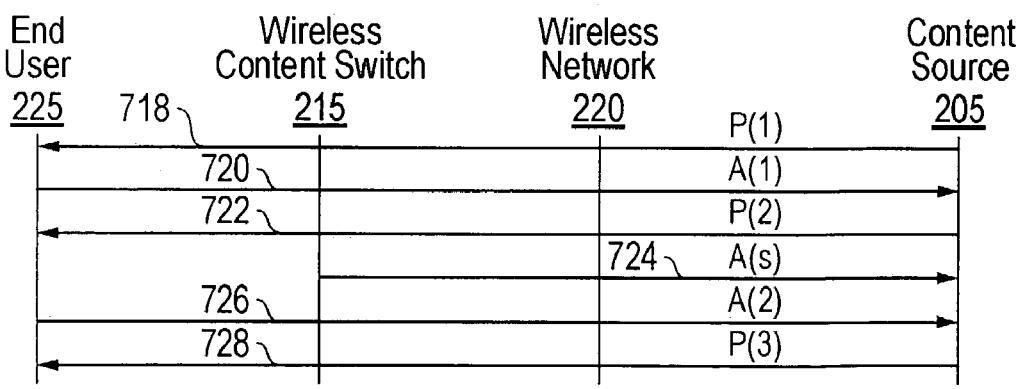

The wireless content switch 218 analysis of the individual flows can be used to provide session specific information to the content source 205 during the multimedia session, which reduces air interface message overhead for exchanging reports during the session delivery as is shown in FIG. 7*d*. The content source 205 transmits the multimedia stream 718 and 722 and receives performance data 720 and 726 from the end user. The wireless content switch 218 transmits session specific information 724 to the content source 205 based upon the wireless content switch's 215 analysis of the transmission to and from the end user 225. The content source 205 then transmits a modified multimedia stream 728 based upon this session specific information. This same technique can also reduce latency on the content source 205 for receipt of network and throughput characteristics. Increased responsiveness for rate adaptation on the content source 205 provides an increased end user 225 experience.

Figure 7E:
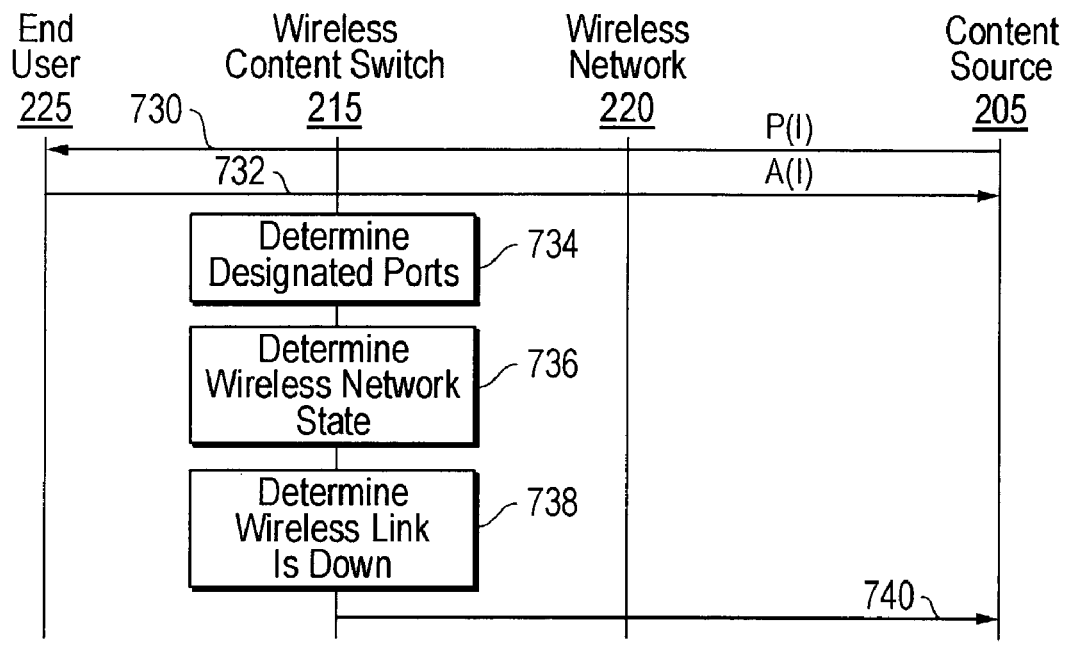

During session start-up as is shown in FIG. 7*e*, the wireless content switch 218 interprets the RTSP or RTP packets transmitted 730 from the content source 205 and transmitted 732 to the content source 205 to determine 734 the designated application/protocol RTCP ports, including RTCP ports. The designated RTCP ports are used for RTCP Client Proxy behavior at either the wireless content switch 218, or an optional wireless content switch 232, or to the content source 205 using open protocols such as ICAP.

The wireless content switch 218 analyzes the session flows and is aware 736 of the state of the wireless network 220 and its affect on individual sessions. Therefore, during link down situations for the session 738, including radio link down situations, the wireless content switch 218, or the combination of the wireless content switch 218 and the optional wireless content switch 232, can proxy, or act on behalf of, the receiver to manage the content source 205 by providing a signal to terminate or pause the session payload packet delivery 740 via RTSP messages. In a similar manner, in the event of wireless network 220 congestion or air interface resource depletion or on getting a higher precedence, the wireless content switch 218, or the combination of wireless content switch 218 and the optional wireless content switch 232, can proxy, or act on behalf of, the receiver to terminate or pause the session payload packet delivery.

Figure 7F:
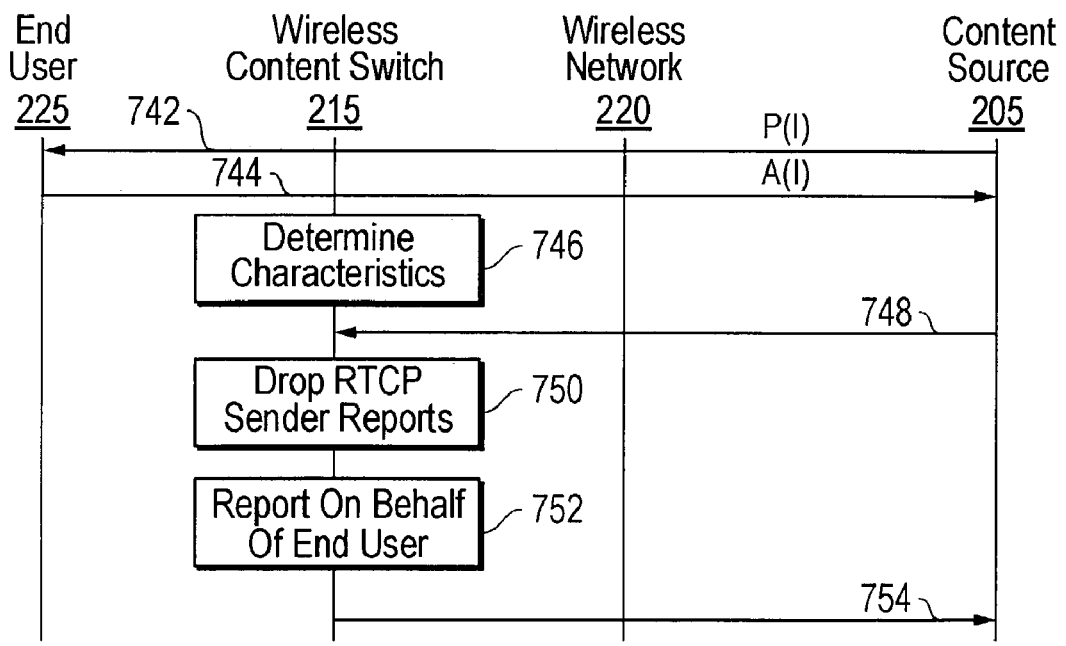

The wireless content switch 218 can analyze the session packet flow 742 and 744 and observe or calculate characteristics 746 of the wireless network 220 and air interface including jitter and packet loss statistics, as well as throughput as is shown in FIG. 7*f*. During high usage periods, the wireless content switch 218, or the combination of wireless content switch 218 and the optional wireless content switch 232, can drop or throttle 750 RTCP sender reports 748 for all sender reports going to end users 225 who are receivers. In a similar manner, RTP Packets can be dropped when network performance thresholds have been reached.

The wireless content switch 218, or the combination of wireless content switch 218 and the optional wireless content switch 232, can also act as a proxy in the RTCP protocol stream, including, but not limited to such functions as periodically reporting 752 on behalf of the end user 225 providing the jitter and packet loss statistics 754 to the content source 205. This will avoid RTCP packets over the air. In another disclosed embodiment, the wireless content switch 218 observes the air interface and wireless network 220 performance. The wireless content switch 218 or the combination of wireless content switch 218 and optional wireless content switch 232, sends RTCP receiver reports or RTCP BYE packet to the content source 205 when the session has lost access connectivity. If the wireless content switch 218 observes a change in the Quality of Service parameters during a session transfer, this observation can also be provided in an RTCP proxy report. Where appropriate, instead of serving as a proxy for standard RTCP messages, the wireless content source 215, or the combination of the wireless content switch 218 and the optional wireless content source 230, can send Application Specific RTCP packets using a pre-defined format. Such packets would contain more information than the standard receiver reports.

As noted above, the wireless content switch 218 is aware of the state of the wireless network 220 and the air interface performance. The wireless content switch 218 is able to determine throughput by monitoring session flows, and can provide valuable Network Performance Monitoring information for multimedia services. These services include but are not limited to collecting overall multimedia statistics based on RTCP reports for a wide variety of applications. In this case, the wireless content switch 218 captures all the RTCP packets from the end user 225 and evaluates the performance of the GPRS network and its media distribution capabilities. The wireless content switch 218 could monitor that RTCP packets are sent within a small and known fraction of the overall session bandwidth, alerting when a threshold is crossed.

In another exemplary embodiment, the wireless content switch 218 could use performance analysis to suggest encoding rates and streaming rates for content providers, content sources and streaming media servers.

Although the foregoing detailed description describes certain embodiments with a degree of specificity, it should be noted that the foregoing embodiments are by way of example, and are subject to modifications, substitutions, or alterations without departing from the spirit or scope of the invention. Those skilled in the art will recognize that various messages can exist to provide similar functions. Accordingly, the invention is only limited by the following claims, and equivalents thereof.

What is claimed is:

1. A wireless content switch for optimizing a multimedia transmission from a content source to an end user over a link, said wireless content switch comprising:
   an upstream port for receiving one or more data packets and for transmitting one or more status to a content source;
   a downstream port for transmitting the one or more data packets and for receiving one or more status from an end user;
   at least one processing unit coupled to the upstream and down stream ports;
   a memory for storing the one or more data packets responsive to receiving the data packets; and
   optimization code stored in the memory, the optimization code, when executed, performing the steps of:
   receiving at least one data packet at the upstream port;
   transmitting the data packet via the downstream port;
   receiving status information at the downstream port;
   transmitting status information via the upstream port;
   determining quality of service assigned to the end user;
   determining session specific status for the end user; and
   transmitting the quality of service and session specific status via the upstream port.

2. The wireless content switch of claim 1 wherein the step of determining the quality of service includes retrieving the quality of service negotiated for the end user from a look-up table.

3. The wireless content switch of claim 1 wherein the step of determining the session specific status includes determining jitter.

4. The wireless content switch of claim 1 wherein the step of determining the session specific status includes determining packet loss.

5. The wireless content switch of claim 1 wherein the step of determining the session specific status includes determining mobility information.

6. The wireless content switch of claim 1 wherein the step of determining the session specific status includes determining roundtrip delay.

7. The wireless content switch of claim 1 wherein the step of determining the session specific status includes determining bandwidth variations.

8. The wireless content switch of claim 1 wherein the step of determining the session specific status includes determining the session specific status based upon status transmissions from a wireless network.

9. The wireless content switch of claim 8 wherein the step of determining the session specific status based upon status transmissions from the wireless network includes determining the session specific status based upon radio priority.

10. The wireless content switch of claim 8 wherein the step of determining the session specific status based upon status transmissions from the wireless network includes determining the session specific status based upon link availability.

11. The wireless content switch of claim 8 wherein the step of determining the session specific status based upon status transmissions from the wireless network includes determining the session specific status based upon mobility information/ routing area information.

12. The wireless content switch of claim 8 wherein the step of determining the session specific status based upon status transmissions from the wireless network includes determining the session specific status based upon leak rate.

13. The wireless content switch of claim 1 wherein the step of determining the session specific status includes determining the session specific status based upon status transmissions from end user.

14. The wireless content switch of claim 13 wherein the step of determining the session specific status based upon status transmissions from the end user includes determining the session specific status based upon bandwidth allocation.

15. The wireless content switch of claim 1 further comprising the steps of:
   determining designated ports;
   determining the radio link is down; and
   transmitting a signal to manage the content source via the upstream port.

16. The wireless content switch of claim 15, wherein the step of determining designated ports includes determining designated application/protocol ports.

17. The wireless content switch of claim 15, wherein transmitting a signal to manage the content source includes transmitting a pause signal.

18. The wireless content switch of claim 15, wherein transmitting a signal to manage the content source includes transmitting a terminate signal.

19. The wireless content switch of claim 1 further comprising the steps of:
   determining link characteristics;
   determining high usage of link;
   receiving a report via the upstream port; and
   dropping the report.

20. The wireless content switch of claim 19, wherein the step of receiving the report includes receiving an application/protocol content source report.

21. The wireless content switch of claim 20, wherein the step of receiving the application/protocol content source report includes receiving a RTCP content source report.

22. In a multimedia communication network comprising a wired network and a mobile station, a method of optimizing multimedia transmission, the method comprising:
   receiving at least one data packet from the wired network;
   storing the data packet;
   transmitting the data packet to the mobile station;
   receiving status information from the mobile station;
   transmitting status information to the wired network;
   determining quality of service of the mobile station;
   determining session specific status for the mobile station; and
   transmitting the quality of service and session specific status to the wired network.

23. The method of claim 22 wherein the step of determining the quality of service includes retrieving the quality of service negotiated for the mobile station from a look-up table.

24. The method of claim 22 wherein the step of determining the session specific status includes determining jitter.

25. The method of claim 22 wherein the step of determining the session specific status includes determining packet loss.

26. The method of claim 22 wherein the step of determining the session specific status includes determining mobility information.

27. The method of claim 22 wherein the step of determining the session specific status includes determining roundtrip delay.

28. The method of claim 22 wherein the step of determining the session specific status includes determining bandwidth variations.

29. The method of claim 22 wherein the step of determining the session specific status includes determining the session specific status based upon status transmissions from the mobile station.

30. The method of claim 29 wherein the step of determining the session specific status based upon status transmissions from the mobile station includes determining the session specific status based upon bandwidth allocation.

31. The method of claim 22 further comprising the steps of:
   determining designated ports;
   determining the link is down; and
   transmitting a signal to manage the content source to the wired network.

32. The method of claim 31, wherein transmitting a signal to manage the content source includes transmitting a pause signal.

33. The method of claim 31, wherein transmitting a signal to manage the content source includes transmitting a terminate signal.

34. The method of claim 31, wherein the step of determining designated ports includes determining designated application/protocol ports.

35. The method of claim 34, wherein the step of determining designated application/protocol ports includes determining designated RTCP ports.

36. The method of claim 31, wherein the step of determining the link is down includes determining the radio link is down.

37. The method of claim 22 further comprising the steps of:
   determining link characteristics-determining
   high usage of link:
   receiving a report from the wired network; and
   dropping the report.

38. The method of claim 37, wherein the step of receiving the report includes receiving an application/protocol wired network report.

* * * * *